United States Patent [19]

Sano et al.

[11] Patent Number: 4,811,386
[45] Date of Patent: Mar. 7, 1989

[54] CALLED PARTY RESPONSE DETECTING APPARATUS

[75] Inventors: Yoshiki Sano; Masaaki Tsukada, both of Tokyo, Japan

[73] Assignee: Tamura Electric Works, Ltd., Tokyo, Japan

[21] Appl. No.: 81,306

[22] Filed: Aug. 3, 1987

[30] Foreign Application Priority Data

Aug. 11, 1986 [JP]  Japan ................................ 61-186913

[51] Int. Cl.$^4$ .................... H04M 15/30; H04M 17/02
[52] U.S. Cl. ..................................... 379/132; 379/372; 379/387
[58] Field of Search .................... 379/131, 132, 361, 6, 379/97, 123, 140, 372, 377, 387

[56] References Cited

U.S. PATENT DOCUMENTS 4,417,101 11/1983 Serres et al. ........................ 379/131
4,612,418 9/1986 Takeda et al. ..................... 179/81 R

FOREIGN PATENT DOCUMENTS 0012102 7/1984 European Pat. Off. .

Primary Examiner—Stafford D. Schreyer
Attorney, Agent, or Firm—Perman & Green

[57] ABSTRACT

A called party response detecting apparatus includes a plurality of filter units for respectively detecting natural frequency components included in a plurality of signals sent from a telephone line. The apparatus also includes switching units for switching input levels of the filter units in a plurality of steps and a continuous signal detector for detecting that a logical sum output from the filter units has continued for a predetermined interval of time. An input level control unit operates to control the switching units to set an input level at a lowest level while waiting for a signal and also to reset the input level at a predetermined level different from the lowest level when an output is obtained from one of the filter units. During this reset operation, the input level control unit decreases the input level in steps until an output is obtained from the continuous signal detector. The apparatus further includes a discriminator for determining, when the continuous signal detector continuously detects logical sum outputs from the filter units for the predetermined time, a plurality of signal tones and a called party response in accordance with the frequency pattern of the outputs from the filter units within the predetermined time.

19 Claims, 9 Drawing Sheets

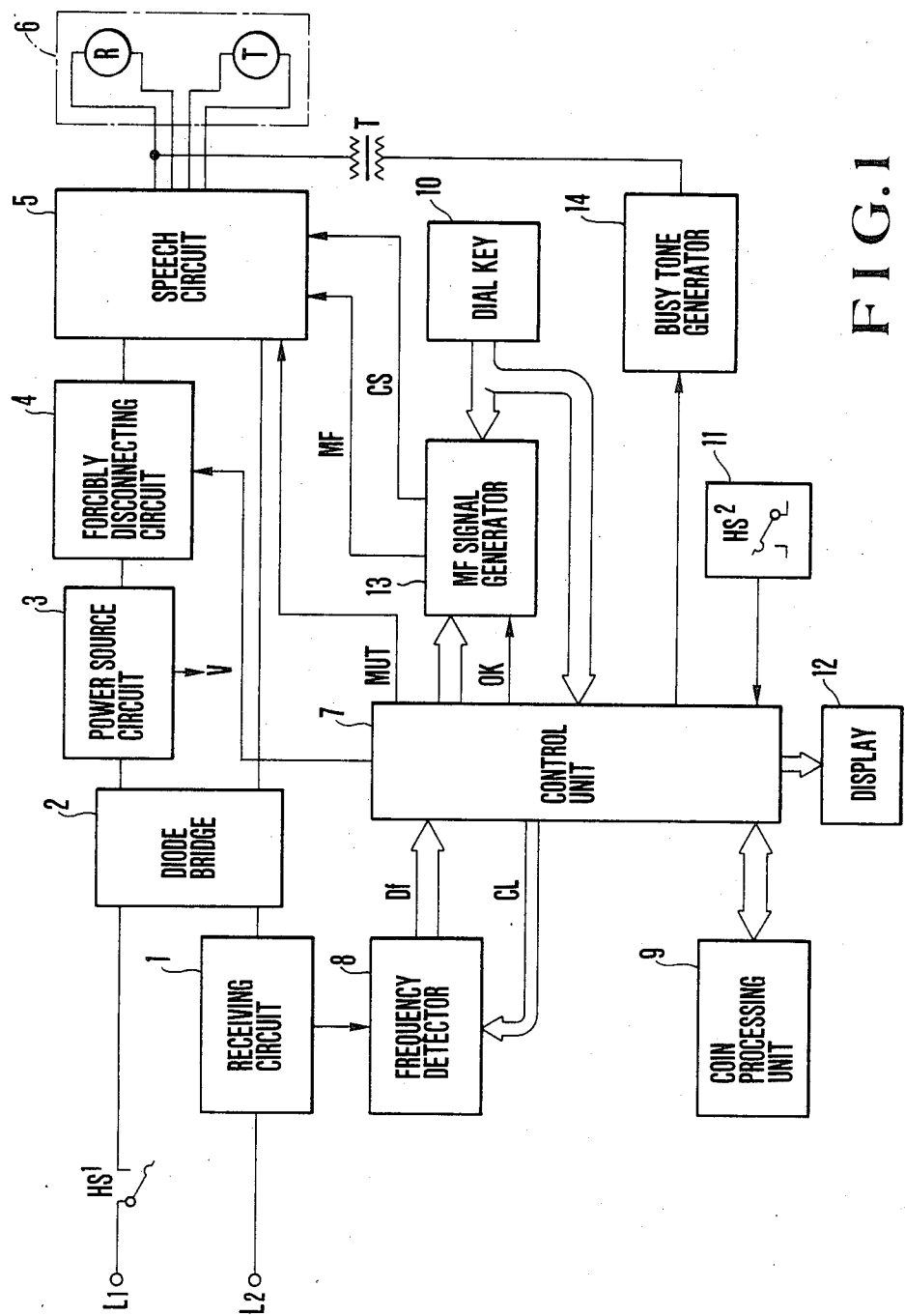
F I G. 1

CALLED PARTY RESPONSE DETECTING APPARATUS

BACKGROUND OF THE INVENTION

The present invention relates to an apparatus for automatically detecting a called party response in a terminal connected to a telephone line to which a signal representing a called party response is not sent.

In general, when dialing is performed through a public telephone line and a called party responses it, a signal such as a reversing pulse representing a called party response is sent from an exchange, and this signal arrives from a telephone line. In a terminal of a public telephone set and the like, charging is performed in accordance with this signal such as a reversing pulse.

On the contrary, in some foreign countries, the above signal such as a reversing pulse is not sent at all to some telephone lines upon a called party response even if they are connected to public telephone sets. In this case, since charging cannot be performed by a conventional means, a called party response is detected by a special means.

That is, a means for disabling a transmitter of a calling party, and detecting a voice of a called party by an amplifying detector and the like, thereby determining a called party response, a means for detecting a ring back tone in the same manner, and determining a called party in accordance with a predetermined time lapse from completion of detection, or a combination of both means, is generally used.

However, signals sent from a telephone line include a dial tone, a busy tone, and an intercept tone such as talkie guide in addition to a called party voice, and a ring back tone. Therefore, if these signals are detected, they are erroneously determined to be a called party response. As a result, unreasonable charging is performed to cause an unexpected loss to a user.

SUMMARY OF THE INVENTION

It is, therefore, a principal object of the present invention to provide an apparatus capable of automatically detecting a called party response.

According to an aspect of the present invention, there is provided a called party response detecting apparatus in a terminal connected to a telephone line to which a signal representing a called party response is not sent, including a plurality of filter units, connected to input sides in common, for respectively detecting natural frequency components included in a plurality of signals sent from the telephone line, switching means, arranged at a common input side of the filter units, for switching input levels of the filter units in a plurality of steps, continuous signal detecting means for detecting that a logical sum output from the filter units has continued for a predetermined time, input level control means for controlling the switching means to set an input level in a lowest level while waiting for a signal, to reset the input level in a predetermined level different from the lowest level when an output is obtained from one of the filter units, and during this reset operation, to decrease the input level step by step until an output is obtained from the continuous signal detecting means, and discriminating means for discriminating, when the continuous signal detecting means continuously detects logical sum outputs from the filter units for the predetermined time, a plurality of signal tones from a called party response in accordance with a generation frequency pattern of the outputs from the filter units within the predetermined time.

BRIEF DESCRIPTION OF THE DRAWINGS

FIG. 1 is, a block diagram of a public telephone set;

DETAILED DESCRIPTION OF THE PREFERRED EMBODIMENT

Figure 2:
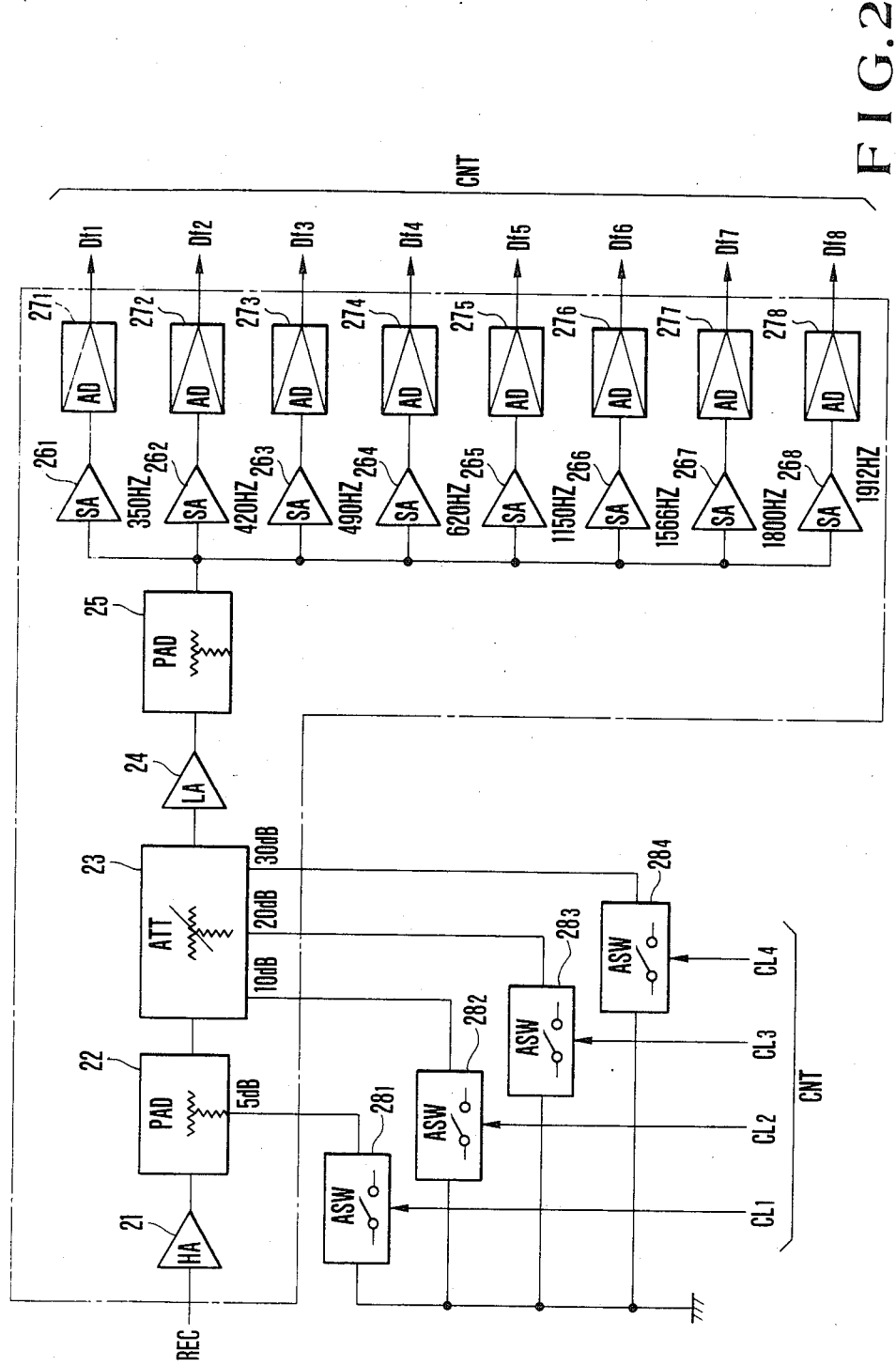
FIG. 2 is a block diagram of a frequency detector 8 shown in FIG. 1.

An embodiment of the present invention will be described in detail with reference to the accompanying drawings.

FIG. 1 shows a public telephone set. In FIG. 1, a speech circuit (to be referred to as a TKC hereinafter) 5 which forms a communication loop and has transmitting and receiving amplifiers is connected to line terminals $L_1$ and $L_2$ to which telephone lines from an exchange are connected, through a hook switch $HS^1$, a receiving circuit (to be referred to as an REC hereinafter) 1, a diode bridge (to be referred to as a DB hereinafter) 2, a power source circuit (to be referred to as a PS hereinafter) 3, and a forcible disconnecting circuit (to be referred to as a CB hereinafter) 4. A transmitter T and a receiver R of a handset 6 are connected to the speech circuit 5.

A control unit (to be referred to as a CNT hereinafter) 7 consisting of a processor (to be referred to as a CPU hereinafter) such as a microprocessor, a memory, and the like is provided to perform determination in accordance with outputs from a frequency detector (to be referred to as an FDT hereinafter) 8, a coin processing unit (to be referred to as a CPS hereinafter) 9 which performs coin discrimination and collection, a dial key (to be referred to as a DK hereinafter) 10, a hook switch $HS^2$, and the like, thereby controlling the CPS 9, a display (to be referred to as a DP hereinafter) 12, an MF signal generator (to be referred to as an MFG hereinafter) 13 for generating an MF signal, the TKC 5, the CB 4, and the like.

Note that the MFG 13 is operated in response to an output from the DK 10 and is controlled by the CNT 7. That is, only when an enable signal OK is supplied from the CNT 7, the MFG 13 generates an MF signal according to an operation of the DK 10 and supplies a control signal CS to the TKC 5 so that the MF signal is sent as a dial signal through the TKC 5. In order to transmit monitor information to a service center, the MFG 13 performs dialing to a specific address such as a service center in the same manner as described above and transmits the MF signal representing monitor information through the same line in accordance with control of the CNT 7.

When the hook switch $HS^1$ is turned on by an off-hook operation to close a DC loop through the TKC 5 and a loop current of a predetermined polarity is supplied by the DB 2, the PS 3 charges a capacitor by this loop current and supplies a terminal voltage of the capacitor as a power source voltage V to the respective units.

Therefore, if it is a preloop method, the DC loop is closed by the off-hook operation and the CNT 7 outputs the enable signal OK in accordance with an output supplied from the CPS 9 upon insertion of coins. As a result, dialing by the DK 10 is enabled so that communication is allowed upon a called party response.

However, even if a called party responses, a rate signal such as a reversing pulse does not arrive in the telephone line, and a signal supplied from the telephone line through the REC 1 which uses a transformer and the like is detected by the FDT 8 in units of frequency components in order to detect the called party response. The CNT 7 monitors whether or not a detection output Df continues for a predetermined time interval and determines in accordance with a monitoring result whether it is one of various signal tones or a called party voice. If the CNT 7 determines that it is a called party voice, i.e., detects a called party response, the CNT 7 controls the CPS 9 to collect coins and disables a mute signal MUT with respect to the TKC 5 to release an inoperative state of the transmitter T. In addition, when inserted coins are used up, the CNT 7 controls the CB 4 to open the DC loop for a predetermined time interval, thereby disengaging an exchange to forcibly disconnect the line.

Note that depending on a type of the DP 12, the CNT 7 displays a coin insertion/accumulation state as needed and has a self diagnosis program. That is, the CNT starts the self diagnosis program in accordance with an output from the hook switch $HS^2$ which corresponds to the off-hook operation, detects a full state of a collecting section in the CPS 9, jamming of a coin, disconnection caused by robbery of the handset 6, and the like, and in accordance with this detection, causes the DP 12 to display a sign representing out of order and transmits the above monitor information.

A lowest detection level of each frequency component of the FDT 8 can be varied by a control signal CL, and the CNT 7 controls the FDT 8 in accordance with conditions to set the lowest detection level at a desired value.

In addition, a busy tone generator (to be referred to as a BTG hereinafter) 14 is provided to locally generate a busy tone. The BTG 14 outputs this local busy tone in accordance with control of the CNT 7 and supplies it to the receiver R of the handset 6 through the transformer T, thereby informing a user of impossibility of communication.

A description of the operation of CNT 7 will now be given. When the charge voltage of the capacitor built into the PS 3 reaches a predetermined voltage (+V) upon the off-hook operation, the general flow is started. First the CNT 7 initializes buffer register and various data registers (not shown). The CNT 7 starts a self diagnosis program and checks whether or not the coin sensor and the like are abnormally operated, and whether or not the collecting section (not shown) is full. The contents of the self diagnosis program are described in European Patent Publication No. 0012102A1. When the CNT 7 detects that normal communication can be performed operation continues. However, when an abnormality is detected in the coin sensor or the collecting section is full, the corresponding flag is set first before operation continues. In self diagnosis, when the CNT 7 detects an abnormality, an abnormality display is performed at the display 12 in accordance with the content of the flag in the display operation.

Next the CNT 7 sets a flag reference timer to have a processing cycle of 4 ms as the operation cycle of the first group and causes the first reference timer to start. The first reference timer is arranged in the CNT 7. Thereafter, the CNT 7 checks whether or not any operating soft timers among the plurality of soft timers arranged to count the ON time of an accumulation magnet (not shown) or the like are present. If any operating soft timer is present, the count of this soft timer is incremented. Finally, the CNT 7 checks whether or not the count of the soft timer has reached a predetermined value. When "time over" is detected, the CNT 7 deactivates the accumulating magnet. In this case, the foregoing procedures are performed in every 4-ms cycle set by the first reference timer. The timer having the period of several hundred microseconds is counted by the first frequency-divider timer. When a timer has a period longer than one second, the second frequency-divider timer is used. The frequency-divider timers are arranged as soft timers in a memory area. The time counting function of each soft timer is not only used to count the ON time of the accumulating magnet but is also used as a timer for supplying, to the corresponding register, read address signals for the program (e.g., accumulation detection) to be performed with predetermined start and end times. Thus, the soft timers are used to count the ON times of the accumulating magnet and a reset magnet (not shown). In other words, the time counting functions of the respective soft timers are selectively defined by the operations. After definition of the time counting functions, the count in the timer operation is updated. In this case, the definition of the time counting function is determined by the operation content to be performed with the specified end (time up) time.

In input sensing, the CNT 7 detects all signals supplied thereto. The CNT 7 is operated based on the detection results and checks in a ready task checking step whether or not any operations, such as coin detection are to be performed. If the CNT 7 detects that an operation is requested, the corresponding task flag is set in the task flag register.

The CNT 7 then checks in accordance with the predetermined priority order whether or not the task ready flags corresponding to the respective operations are set. If NO, the flow advances, and the CNT 7 is set in the idling mode. However, when any one of the task ready flags corresponding to the respective operations are set, the start address of the highest priority operation corresponding to the "set" task ready flag is set in the program counter in the task start operation. The address set in the program counter is used as the start address of the operation program in task execution. When the operation or operations are completed, the CNT 7 is set in the idling mode so that most of the functions of elements are set in the disabling state. When a new interrupt signal that indicates a new processing cycle of 5 ms is generated from the first reference timer, the flow once again returns to those steps following the aforedescribed self-diagnosis program. Thereafter, the same operation as described above is repeated.

FIG. 2 is a block diagram of the FDT 8. In FIG. 2, a main system is constituted by a preamplifier (to be referred to as an HA hereinafter) 21, a fixed attenuator (to be referred to as a PAD hereinafter) 22, a variable attenuator (to be referred to as an ATT hereinafter) 23, a limiting amplifier (to be referred to as an LA hereinafter) 24, a PAD 25, selecting amplifiers (to be referred to as SAs hereinafter) $26_1$ to $26_8$ each having an individual selection frequency, and amplifying detectors (to be referred to as ADs hereinafter) $27_1$ to $27_8$ each incorporating a Schmitt trigger circuit, and these elements are fabricated into an integrated circuit. In addition, insertion losses of the PAD 22 and the ATT 23 can be arbitrarily set by switching circuits (to be referred to as ASWs hereinafter) $28_1$ to $28_4$ such as analog switches. That is, when all the ASWs $28_1$ to $28_4$ are turned off, an insertion loss is 0 dB, when only the ASW $28_1$ is turned on, it is 5 dB, when only the ASW $28_2$ is turned on, it is 10 dB, when only the ASW $28_3$ is turned on, it is 20 dB, and when only the ASW $28_4$ is turned on, it is 30 dB. Therefore, by determining combinations of control signals $CL_1$ to $CL_4$ in correspondence to ON/OFF of the ASWs $28_1$ to $28_4$ according to the lowest detection level (to be referred to as an LDL hereinafter), the LDL corresponding to each frequency component of the FDT 8 can be set.

In addition, when the insertion loss of the PAD 22 and the ATT 23 is 0 dB, the LDL is −55 dBV at an input of the HA 21, and the LDLs are determined between −55 dBV to −20 dBV in units of 5 dB steps by combinations of the respective insertion losses of the PAD 25 and the ATT 23. The following codes are assigned to the respective LDLs in association with control of the CNT 7.

TABLE 1

| Code | LDL (dBV) | Code | LDL (dBV) |
|---|---|---|---|
| 0 | −20 | 4 | −40 |
| 1 | −25 | 5 | −45 |
| 2 | −30 | 6 | −50 |
| 3 | −35 | 7 | −55 |

On the other hand, the various signal tones sent from the telephone line include the following natural frequency components, and optimal LDLs for respective detections have relationships shown in Table 2.

TABLE 2

| | LDL | | | |
|---|---|---|---|---|
| | 0 to 3 | 4 to 7 | | |
| Frequency (Hz) | Dial Tone (DT) | Ring Back Tone (RBT) | Busy Tone (BT) | Intercept Tone (INT) |
| 350 | o | | | |
| 420 | o | o | | |
| 490 | | o | | |
| 620 | o | | o | |
| 1150 | | | | o |
| 1566 | | | | o |
| 1800 | | | | o |
| 1912 | | | | o |

Note that as for the dial tone (to be referred to as a DT hereinafter), the ring back tone (to be referred to as an RBT hereinafter), the busy tone (to be referred to as a BT hereinafter), and the intercept tone (to be referred to as an INT hereinafter) including a chime tone, natural frequency components thereof appear continuously for predetermined time intervals, respectively, and the RBT and the BT appear intermittently in predetermined cycles, respectively. However, each frequency component of the voice appears randomly. Therefore, each determination is performed in accordance with the above conditions.

That is, in this case, the RBT repeats 1-s on, 3-s off or the RBT repeats 2-s on, and 4-s off, the BT repeats 0.5-s on, 0.5-s off or the BT repeats 0.25-s on, and 0.25-s off, and a frequency component of 1,800 Hz of the INT continues for 0.2 s or more while the DT is a continuous tone. Therefore, each detection is performed in accordance with these time relationship.

Therefore, in FIG. 2, a signal sent from the telephone line through the REC 1 is amplified by the HA 21, attenuated in accordance with the LDL by the PAD 22 and the ATT 23, and then its amplitude is limited by the LA 24. The resultant signal is supplied to the SAs $26_1$ to $26_8$ through the PAD 25, and its respective frequency components of 350 to 1912 Hz are extracted thereby. Predetermined levels or more of the respective extracted outputs are detected and amplified by the ADs $27_1$ to $27_8$ and then supplied to the CNT 7 as eight detection output bits $D_{f1}$ to $D_{f8}$ each representing binary values, and at the same time, are applied with setting of the LDLs in accordance with the control signals $CL_1$ to $CL_4$ from the CNT 7. Therefore, in accordance with status of the detection output bits $D_{f1}$ to $D_{f8}$ and these durations, the CNT 7 shown in FIG. 1 performs above determination and detection.

Figure 3:
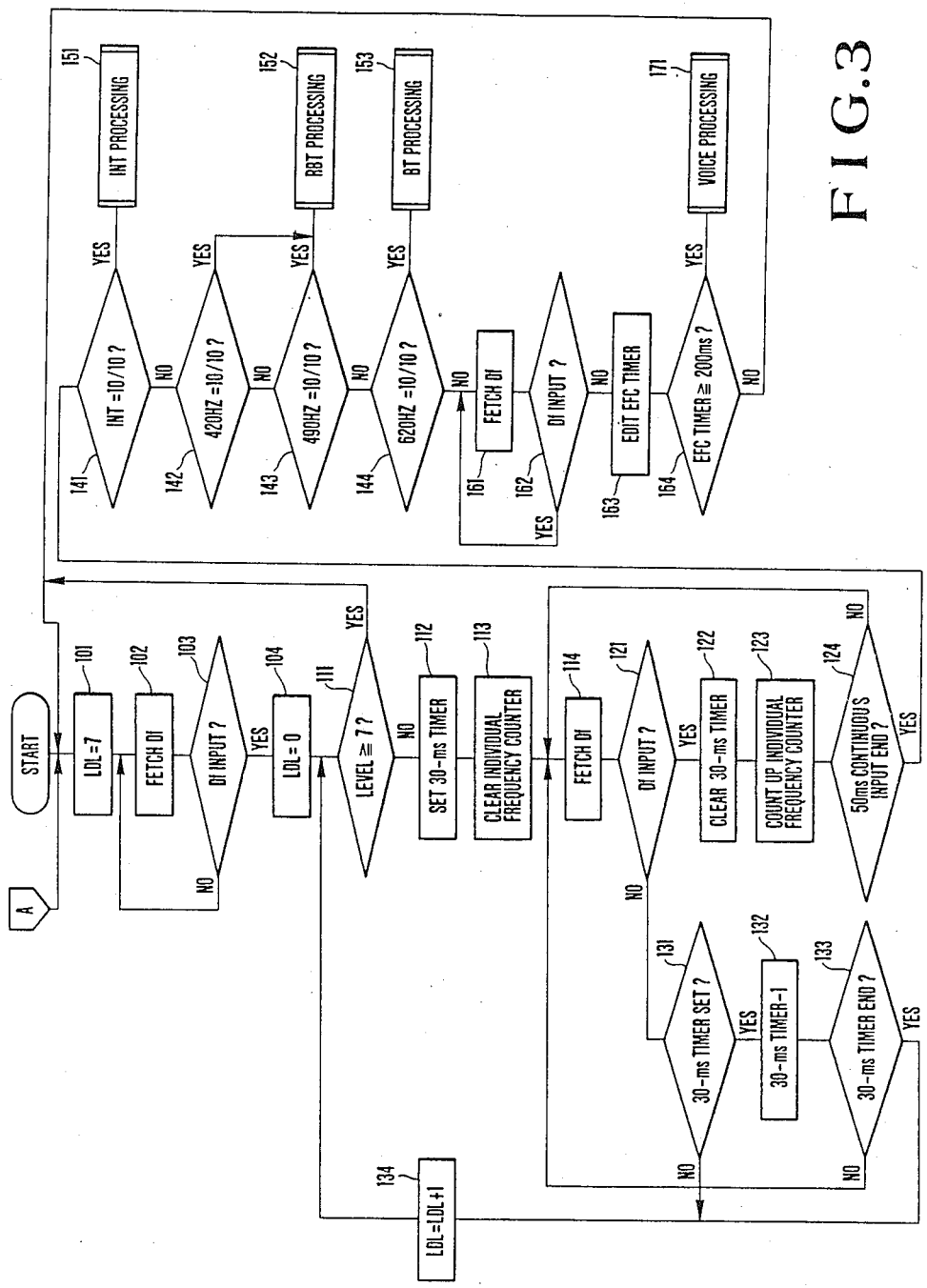
FIG. 3 is a general flow chart for explaining determination and control.

FIG. 3 is a general flow chart for explaining determination and control of the CPU in the CNT 7, in which programs are performed by executing instructions in a memory and accessing the memory for necessary data.

Note the above control and determination are started upon completion of dialing caused by the MF signal sent from the MFG 13 when a user confirms arrival of the DT and operates the DK 10.

That is, at first, in order to detect a signal of low level, the control signal CL is sent to set "LDL=7" as a minimum LDL in step 101, "fetch (detection output) $D_f$" is executed in step 102, and then the CPU checks "$D_f$ input? " in step 103. If Y (YES) in step 103, the control signal CL is changed to execute "LDL=0" in step 104, thereby temporarily setting the highest level. The reason for this is to increase the LDL for preventing detection of noise. After N (NO) in step "LDL≧7? " in step 111, in order to define a necessary minimum detection time by the LDL at that time, "set 30-ms timer (incorporated in the CPU)" is executed in step 112, and then "clear individual frequency counter (provided in the CPU to count generation times of each of the detection output bits $D_{f1}$ to $D_{f8}$)" is executed in step 113. Thereafter, "fetch $D_f$" is executed in step 114 as in step 102, and then the CPU checks "$D_f$ input?" in step 121 as in step 103. If Y in step 121, "clear 30-ms timer (set in step 112)" is executed in step 122, and then "count up individual frequency counter (in step 113)" is executed in step 123 in correspondence to a generated one of the detection output bits $D_{f1}$ to $D_{f8}$. Thereafter, the detection output bits $D_{f1}$ to $D_{f2}$ are sequentially and continuously fetched at time intervals of 5 ms. Since 5 ms × 10 times = 50 ms is set as a frequency component detection period, the flow after step 114 is repeated every 5 ms while N is kept in "50 ms continuous input end?" in step 124.

When N in step 121 from the beginning, subtraction is performed in "30-ms timer − 1" in step 132 because Y is set in "30-ms timer set?" in step 131 corresponding to step 112. Thereafter, if the detection output $D_f$ is not generated by the LDL, the flow after step 114 is repeated until the content of the 30-ms timer becomes 0 and Y is set in "30-ms timer end?" in step 133. If Y in step 133, in order to detect a signal of lower level, the LDL is decreased by one step in "$LDL=LDL+1$" in step 134, and the flow is after step 111 is repeated. If the detection output $D_f$ is not continuously generated by this operation, the flow returns to step 101 when the LDL finally reaches 7 and Y in step 111, and the flow in step 101 and subsequent steps is repeated.

Note that when N in step 121 by interruption of the detection output during repetition of the flow in step 114 and subsequent steps through Y in step 121 and N in step 124, step 134 is executed through N in step 131 to decrease the LDL by one step as described above, and then the flow in step 111 and subsequent steps is repeated.

If the detection outputs are continuously generated 10 times in every 5-ms cycle, Y in step 124. Therefore, in accordance with the counts in units of frequency components in step 123, the CPU determines in "INT=10/10?" in step 141 whether or not one of frequencies of 1,150 Hz, 1,566 Hz, 1,800 Hz, and 1,912 Hz is 10/10 as a frequency in detection. Similarly, the CPU sequentially determines "420 Hz=10/10?" in step 142, "490 Hz=10/10?" in step 143, and "620 Hz=10/10?" in step 144 whether or not frequencies 420 Hz, 490 Hz, and 620 Hz are 10/10, respectively. If Y in the above steps, this means that each frequency component stably continues for 50 ms or more. In this case, the flow advances to "INT processing" in step 151 in accordance with Y in step 141, to "RBT processing" in step 152 in accordance with Y in step 142 or 143, and to "BT processing" in step 153 in accordance with Y in step 144.

On the contrary, if N in all the steps 141 to 144, this means that a single frequency does not continuously arrive, and it is determined that this is not a signal tone of a specific frequency. Therefore, the CPU executes "fetch $D_f$" in step 161 as in step 102 and determines "$D_f$ input?" in step 162 as in step 103. In accordance with N in step 162 and based on a logical sum of the detection output bits $D_{f1}$ to $D_{f8}$, "edit EFC timer (for obtaining an effective data length arranged in the CPU to monitor duration caused by the LDL of the detection output to be determined to be effective" is executed in step 163, thereby obtaining a time representing the series effective data length. If a time measured in accordance with this time is N in "EFC timer $\geq$200 ms" in step 164, a continuous time is too short as a response voice. Therefore, the CPU determines that this is erroneous detection caused by noise, and the flow returns to step 101. If Y in step 164, the flow advances to "voice processing" in step 171.

As described above, the respective frequency components of the signals sent from the telephone line are individually detected, and types of these various signal tones are determined in accordance with duration. On the other hand, if it is determined that this is not any of these signal tones and the respective frequency components are irregularly and continuously detected, it is determined that this is a called party's voice. Therefore, in accordance with this determination, determination is performed in more detail.

Figure 4:
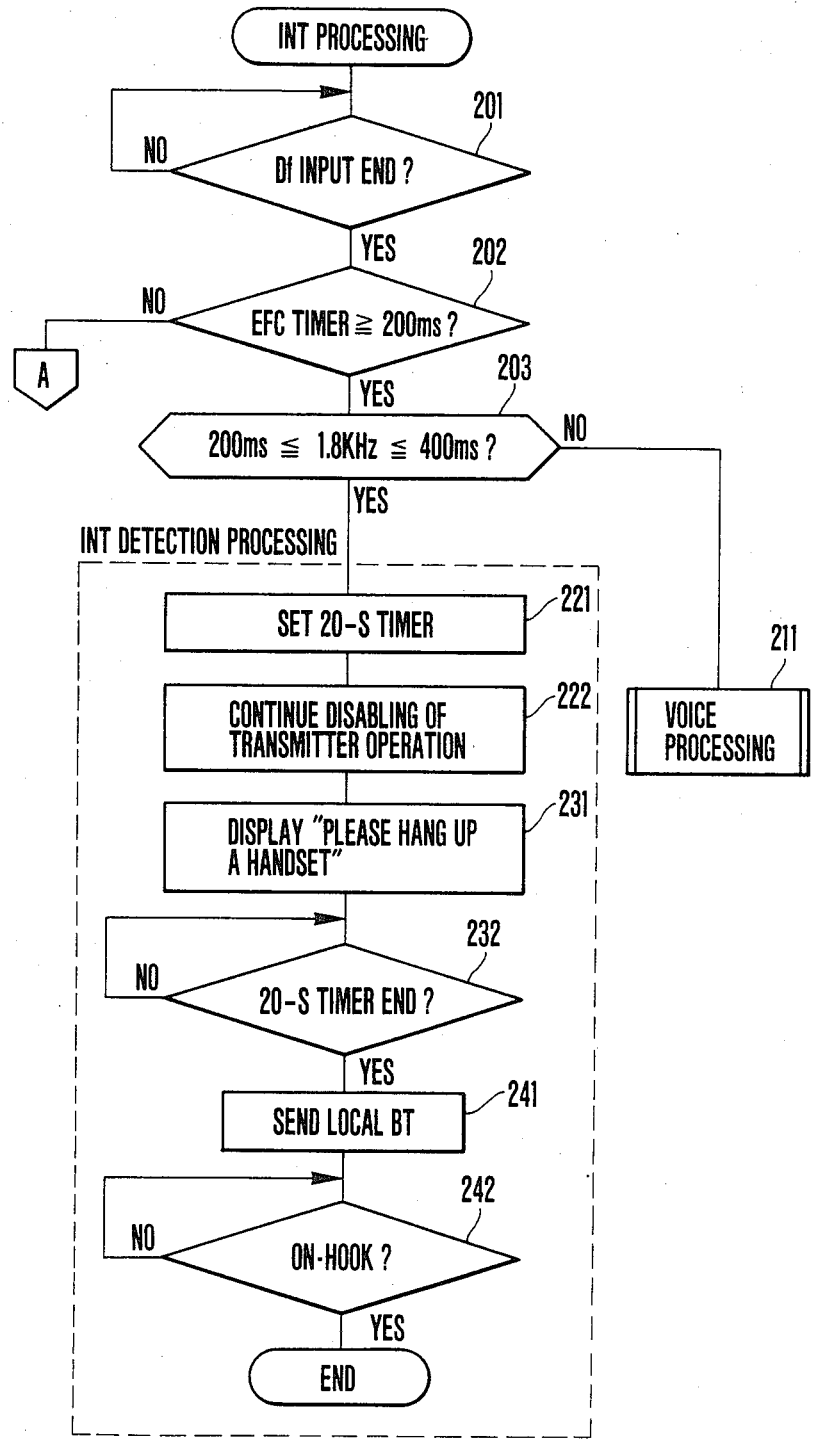
FIGS. 4, 5A, 5B, 6 and 7 are flow charts for explaining subroutines of FIG. 3.

FIG. 4 is a flow chart for explaining a subroutine of "INT processing" in step 151. In FIG. , if Y in "$D_f$ input end?" in step 201 by disabling of the detection output bits $D_{f1}$ to $D_{f8}$, Y in "EFC timer (in step 163) $\geq$200 ms?" is determined in step 202. If so, duration of the detection output bit $D_{f7}$ checks "200 ms$\leq$1.8 KHz$\leq$400 ms?" in step 203. If N in step 203, the flow advances to "voice processing" in step 211, and if Y in step 203, the CPU determines that this is the INT and executes INT detection processing after step 122.

That is, the CPU executes "set 20-s timer (arranged in the CPU)" in step 221, continuously sends the mute signal to the TKC 5 to hold "continue disabling of transmitter operation" in step 222, and sends display data to the DP 12 to execute "display "please hang up a handset"" in step 231. Thereafter, in accordance with Y in "20-s timer (in step 221) END?" in step 232, the CPU controls the BTG 14 to execute "send local BT" in step 241 with respect to the receiver R, and completes a series of control in accordance with Y in "on-hook" in step 242 caused by an output from the hook switch HS².

Therefore, if each of the frequency components of 1,150 Hz, 1,566 Hz, 1,800 Hz, and 1,912 Hz has duration of 200 ms or more and the frequency component of 1,800 Hz has duration of 200 ms to 400 ms, the CPU determines that this is the INT. Then, after the content in step 231 is displayed for 20 s, the local BT is sent to inform the user of impossibility of communication.

Figure 5A:
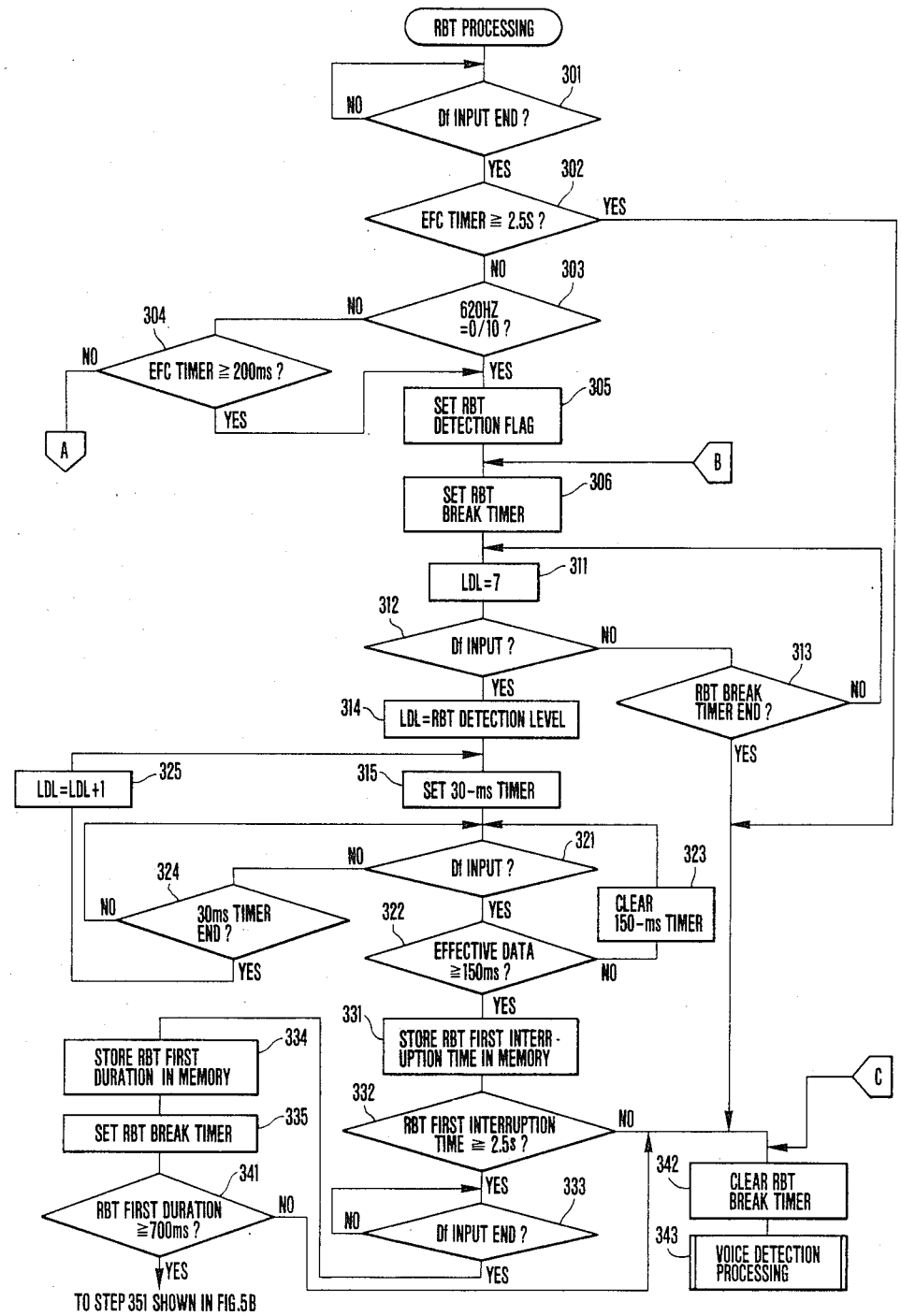
Figure 5B:
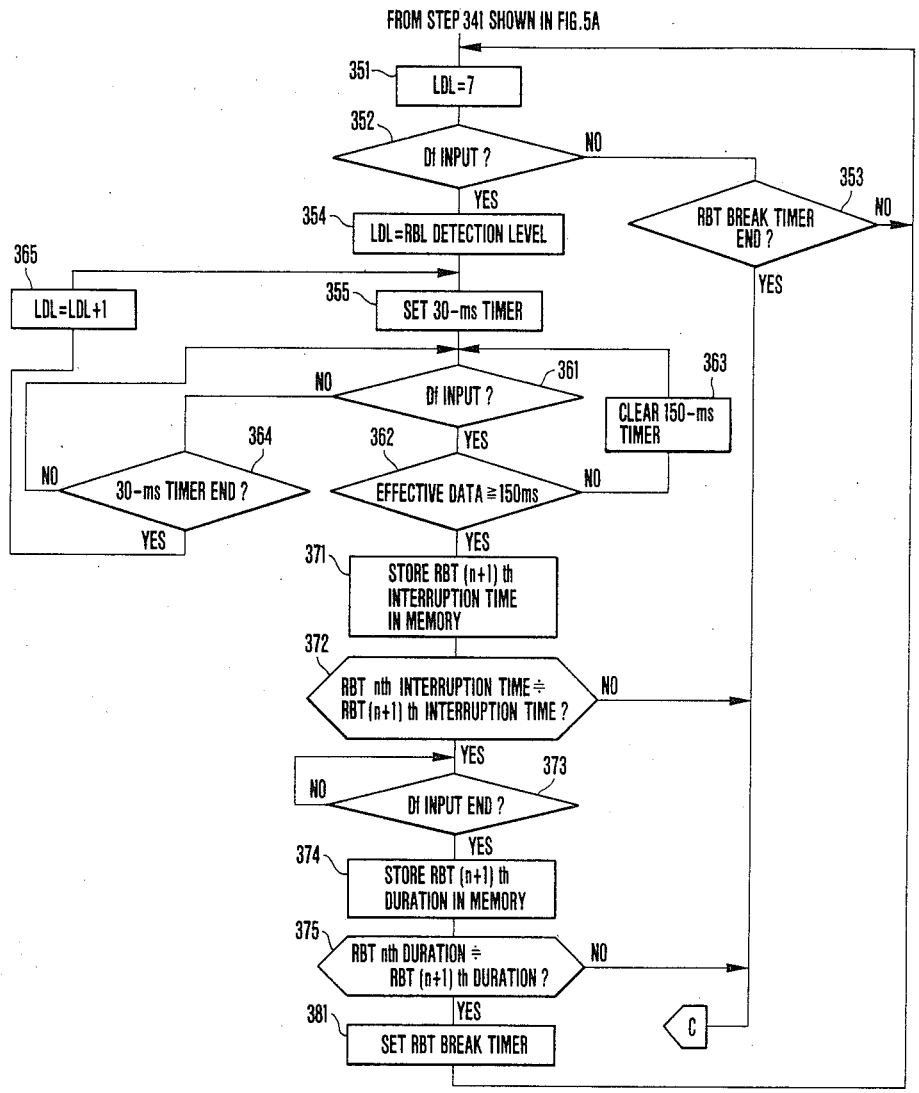

FIGS. 5A and 5B are flow charts for explaining a subroutine of "RBT processing" in step 152. In FIGS. 5A and 5B, if Y in "$D_f$ input end?" in step 301 by disabling of the detection output bits $D_{f1}$ to $D_{f8}$, "EFC timer $\geq$2.5 s?" similar to step 164 is checked in step 302 since duration in an intermittent time is 1 s or 2 s. In order to confirm in accordance with N in step 302 whether or not the BT and the RBT are erroneously detected, frequency in generation of the detection output bit $D_{f4}$ of the BT frequency is checked in "620 Hz=0/10?" in step 303. If N in step 303, the BT may be erroneously detected, so that "EFC timer $\geq$200 ms?" is checked in step 304 similarly in step 302. If N in step 304, it cannot be determined that this is the RBT, and the flow returns to step 101. If Y in step 04 or 303, in order to check in voice detection processing to be described later, "set RBT detection flag" is executed in step 305. Thereafter, in order to monitor a non-signal state longer than an interruption time of 3 s or 4 s in an intermittent time of the RBT, "set RBT break timer (of, e.g., 6 s arranged in the CPU)" is executed in step 306, thereby starting the RBT break timer.

If Y in step 302, this means that a time measured by the EFC timer is 2.5 s or more which is longer than duration 1 s or 2 s of the RBT. Since this condition occurs by only a voice, the flow advances to step 343 through step 342.

Subsequently, the control signal CL is sent to set "LDL=7" in step 311, and the CPU determines "(detection output) $D_f$ input?" in step 312. If N in step 12, the CPU checks "RBT break timer (in step 306) end?" in step 313. In accordance with N in step 313, the flow in step 311 and subsequent steps is repeated. If Y in step 12, "LDL=RBT detection level" is set in step 314 in accordance with Table 2 as in step 311, "set 30-ms timer" is executed in step 315 as in step 112, and "$D_f$ input?" is checked in step 321 as in step 312. In accordance with Y in step 321, the CPU determines duration of data which is not noise but an effective one in "effective data $\geq$150 ms?" in step 322. If N in step 322, the flow after step 21 is repeated through "clear 150-ms timer (used in step 322)" in step 323.

If Y in "30-ms timer end?" in step 324 corresponding to step 315 while N in step 321, the control signal CL is updated in "$LDL=LDL+1$" in step 325 as in step 134 to decrease the LDL, and then the flow in step 315 and subsequent steps is repeated.

If Y in steps 321 and 333, since duration detected for the first time during the intermittent time of the RBT is indefinite, the first interruption time is stored in "store RBT first interruption time in memory" in step 331. Since the interruption time of the RBT is 3 s or 4 s, the content in step 331 determines "RBT first interruption time $\geq 2.5$ s?" in step 332. In accordance with Y in "$D_f$ input end?" in step 333 as in step 301, duration following the first intermittent time is stored in "store RBT first duration in memory" in step 334, and "set RBT break timer" is executed in step 335 as in step 306. Thereafter, since the intermittent time of the RBT is 1 s or 2 s, the content in step 334 determines "RBT first duration $\geq 700$ ms?" in step 341. If N in step 341, this means that the RBT is stopped by a called party response. Therefore, the flow advances to "voice detection processing" in step 343 through "clear RBT break timer" in step 342.

Note that if Y in step 313 or N in step 332, the flow advances to step 342 after detecting that the interruption time of the RBT is increased more than a predetermined one by a called party response.

If Y in step 341, "LDL=7" is set in step 351 as in step 331, and "$D_f$ input?" and "RBT break timer end?" are checked in steps 352 and 353, respectively, as in steps 312 and 313. In accordance with Y in step 352, "LDL=RBT detection level" to "LDL=LDL+1" are executed in steps 354 to 365 as in steps 314 to 325, and in accordance with Y in step 362, "store RBT (n+1)th interruption time in memory" after the second time is executed in step 371 as in step 331. Thereafter, the nth and the (n+1)th interruption times are compared with each other in "RBT nth interruption time =RBT (n+1)th interruption time?" in step 372. If Y in step 372, "$D_f$ input end?" is checked in step 373 as in step 333. In accordance with Y in step 373, "store RBT (n+1)th duration in memory" after the second time is executed in step 374 as in step 334, and the nth and (n+1)th durations are compared with each other in "RBT nth duration=RBT (n+1)th duration?" in step 375 as in step 372. If Y in step 375, "set RBT break timer" is executed in step 381 as in step 335, and then the flow in step 351 and subsequent steps is repeated.

Note that in accordance with N in step 353, the flow immediately returns to step 351 as in step 313, and in accordance with Y in step 353 or N in steps 372 and 375, the flow returns to step 342 since this means that the RBT is stopped by the called party response.

Therefore, if the frequency component of 420 Hz or 490 Hz continues for 150 ms or more, and if the interruption time is 2.5 s or more and the duration is 700 ms or more, it is determined by comparing the current intermittent time and the preceding one whether or not the respective intermittent times are substantially equal. If they are substantially equal, it is determined that this is the RBT which is intermittent in a predetermined cycle of 1-s on and 3-s off, or 2-s on and 4-s off. Thereafter, this comparison is repeated, and then the flow advances to "voice detection processing" to be described later in accordance with stop of the RBT caused by the called party response.

Figure 6:
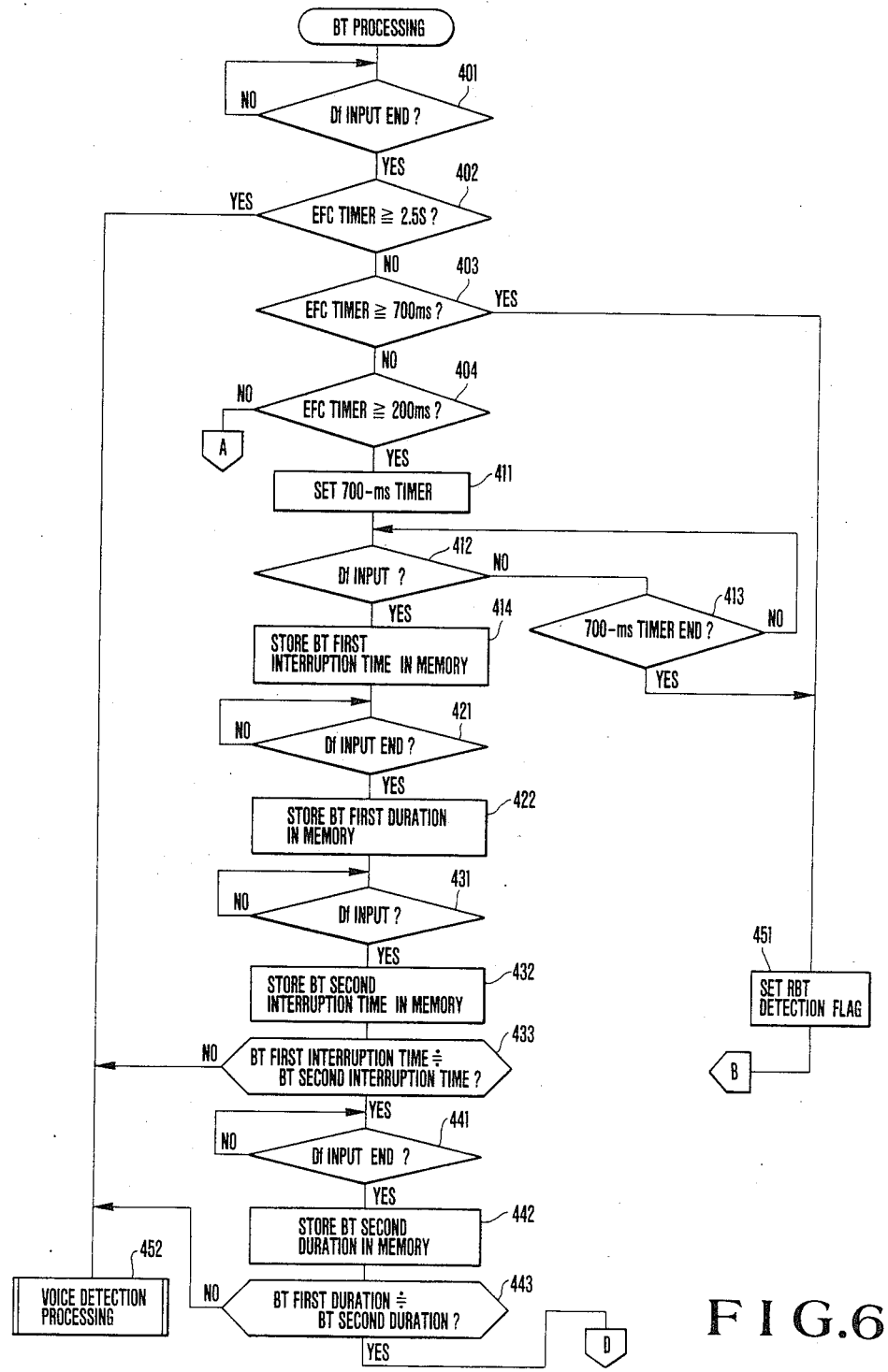

FIG. 6 is a flow chart for explaining a subroutine of "BT processing" in step 153. In FIG. 6, if Y in "$D_f$ input end?" in step 401 by disabling of the detection output bits $D_{f1}$ to $D_{f8}$, the CPU sequentially checks "EFC timer $\geq 2.5$ s?", "EFC timer $\geq 700$ ms?", and "EFC timer $\geq 200$ ms?" in steps 402, 403, and 404, respectively, since the duration of the BRT is 0.25 s or 0.5 s. If N in all steps 402, 403, and 404, this may be noise of duration of 200 ms or less, and the flow returns to step 101. On the contrary, if N in steps 402 and 403 and Y in step 404, duration of the detection output falls within the range of 200 to 700 ms which includes duration of the RBT. Therefore, in order to monitor the intermittent time of 0.25 s or 0.5 s of the BT, "set 700-ms timer (in the CPU)" is executed in step 411. In accordance with N in "$D_f$ (detection outputs $D_{f1}$ to $D_{f8}$) input?" in step 412, "700-ms timer (in step 411) end?" is checked in step 413. While N is kept in step 413, the flow after step 412 is repeated. In accordance with Y in step 412, since duration detected for the first time during the intermittent time of the BT is indefinite, the first intermittent time is stored in "store BT first intermittent time in memory" in step 414.

In accordance with Y in "$D_f$ input end?" in step 421 as in step 401, duration following the first interruption time is stored in "store BT first duration in memory" in step 422, and in accordance with Y in "$D_f$ input?" in step 431, the second interruption time is stored in "store BT second interruption time in memory" in step 432 as in steps 412 and 414. Thereafter, the first and second interruption times are compared with each other in "BT first interruption time=BT second interruption time?" in step 433.

If Y in step 433, in accordance with Y in "$D_f$ input END?" in step 441, the second duration is stored in "store BT second duration in memory" in step 442, and comparison is executed in "BT first duration=BT second duration?" in step 443 as in step 433. If Y in step 443, the flow advances to a predetermined step in "second DT processing", thereby sending the local BT to the receiver R.

If Y in step 403 or 413, since this means that a signal continues for 700 ms or more, it is determined that this is duration of 1 s or 2 s of the RBT. Therefore, after "set RBT detection flag" is executed in step 451, the flow advances to step 306. If Y in step 402, it is determined as in step 302 that this cannot be a signal tone. In accordance with N in steps 433 and 443, it is determined that this cannot be the BT since adjacent interruption times or durations do not coincide with each other while an intermittent cycle of the BT is normally fixed. Therefore, it is determined that this is a voice caused by a response, and the flow advances to "voice detection processing " in step 452 to be described later.

As described above, if the frequency component of 620 Hz continues for 200 to 700 ms, two intermittent times are compared with each other. If they substantially coincide with each other, it is determined that this is the BT which is intermittent in a predetermined cycle of 0.5-s on and 0.5-s off, or 0.25-s on and 0.25-s off. If the frequency component continues for more than 700 ms, the flow advances to "RBT processing", and if it continues for more than 2.5 s, the flow advances to "voice detection processing".

Figure 7:
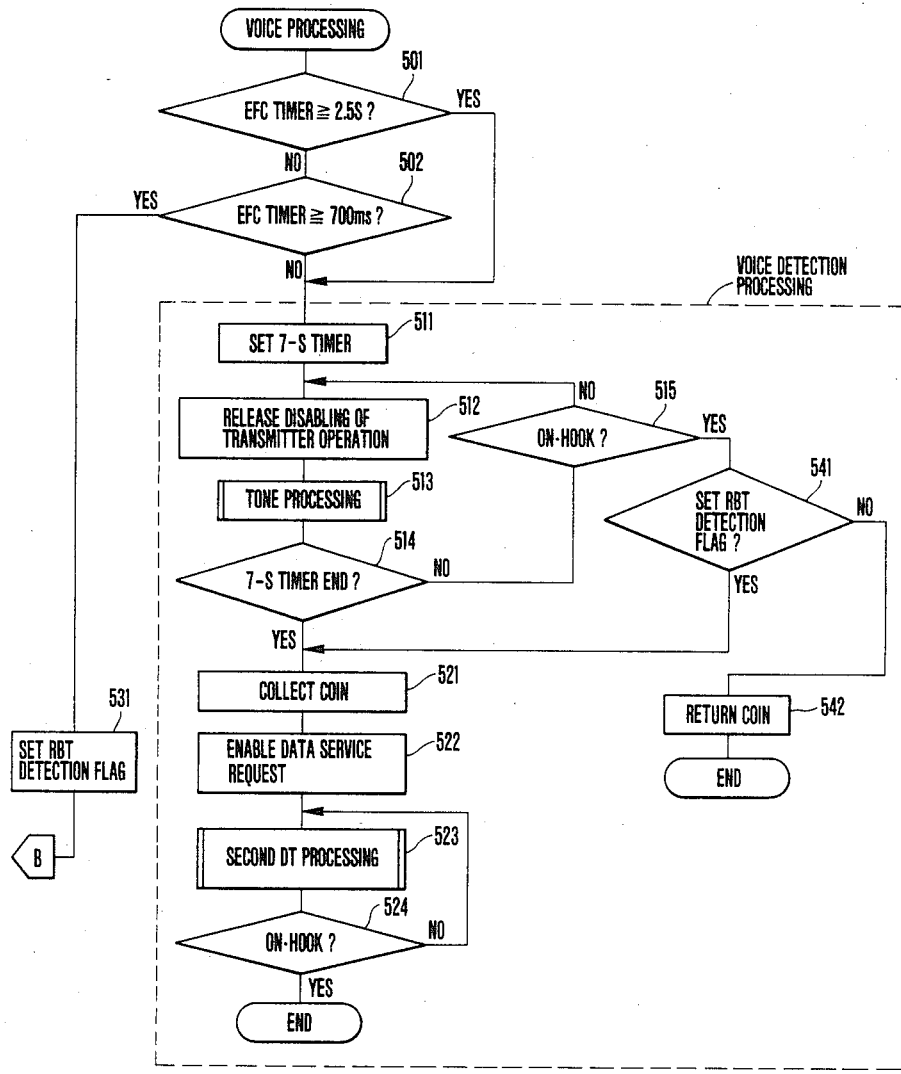

FIG. 7 is a flow chart for explaining a subroutine of "voice processing" in step 171. In FIG. 7, if a time measured by the EFC timer is 700 ms to 2.5 s, the RBT of duration of 1 s or 2 s may be erroneously detected. Therefore, in accordance with N in "EFC timer $\geq 2.5$ s?" in step 501 and Y in "EFC timer $\geq 700$ ms?" in step 502, "set RBT detection flag" is executed in step 531, and then the flow returns to step 306 to determine again whether or not this is RBT. On the other hand, if Y in step 501, i.e., 2.5 s or more, or N in step 502, i.e., 700 ms or less, "voice detection processing" after step 511 is executed.

That is, "set 7-s timer (in the CPU)" is executed in step 511 to start the 7-s timer, and supply of the mute signal MUT is stopped to execute "release disabling of transmitter operation" in step 512, thereby enabling communication. Thereafter, "tone processing"

throughout FIG. 4 is executed in step 513 to determine again whether or not this is a signal tone, and "7-s timer end?" is determined in step 514 in correspondence to step 511. While N is kept in step 514, "on-hook?" is checked in step 515 in accordance with an output from the hook switch HS². If N in step 515, the flow after step 512 is repeated.

In this case, if detection results with respect to the signal tones are not obtained in step 513 and Y in step 514, the CPU determines that communication with respect to a called party is completely started. Then, the CPU controls the CPS 9 to execute "collect coin" in step 521, and in order to enable data service request performed by sending the MF signal, sends the enable signal to execute "enable data service request" in step 522. Thereafter, in order to prevent chain-like repetitive dialing called a chain dial, "second DT processing" is executed in step 523, and "on-hook?" is checked in step 524 as in step 515. In accordance with Y in step 524, a series of control is completed.

As described above, in accordance with Y in step 502, "set RBT detection flag" is executed in step 531, and at the same time, the same flag is set in steps 305 and 451. Therefore, if Y in step 515 while N in step 514, "set RBT detection flag?" is checked in step 541. If Y in step 541, since this means that a called party response is detected with high accuracy through RBT detection even if it is an on-hook operation during temporary voice detection procssing, the CPU determines that communication is once started, and executes step 521. If N in step 541, in order to eliminate erroneous coin collection, the CPU controls the CPS 9 to execute "return coin" 542, and then completes the series of control.

Therefore, when "voice detection processing" is executed under the condition of FIGS. 4, 5A and 5B, or 6, a voice is determined again while changing the LDL by "tone processing" for 7 s, and it is determined that this is not one of the various signal tones, this means that a called party response by a communication voice is detected. Therefore, coins are collected, and when the RBT detection flag is not set even if the on-hook operation is executed within 7 s, coins are returned, thereby eliminating an unexpected loss to the user.

Figure 8:
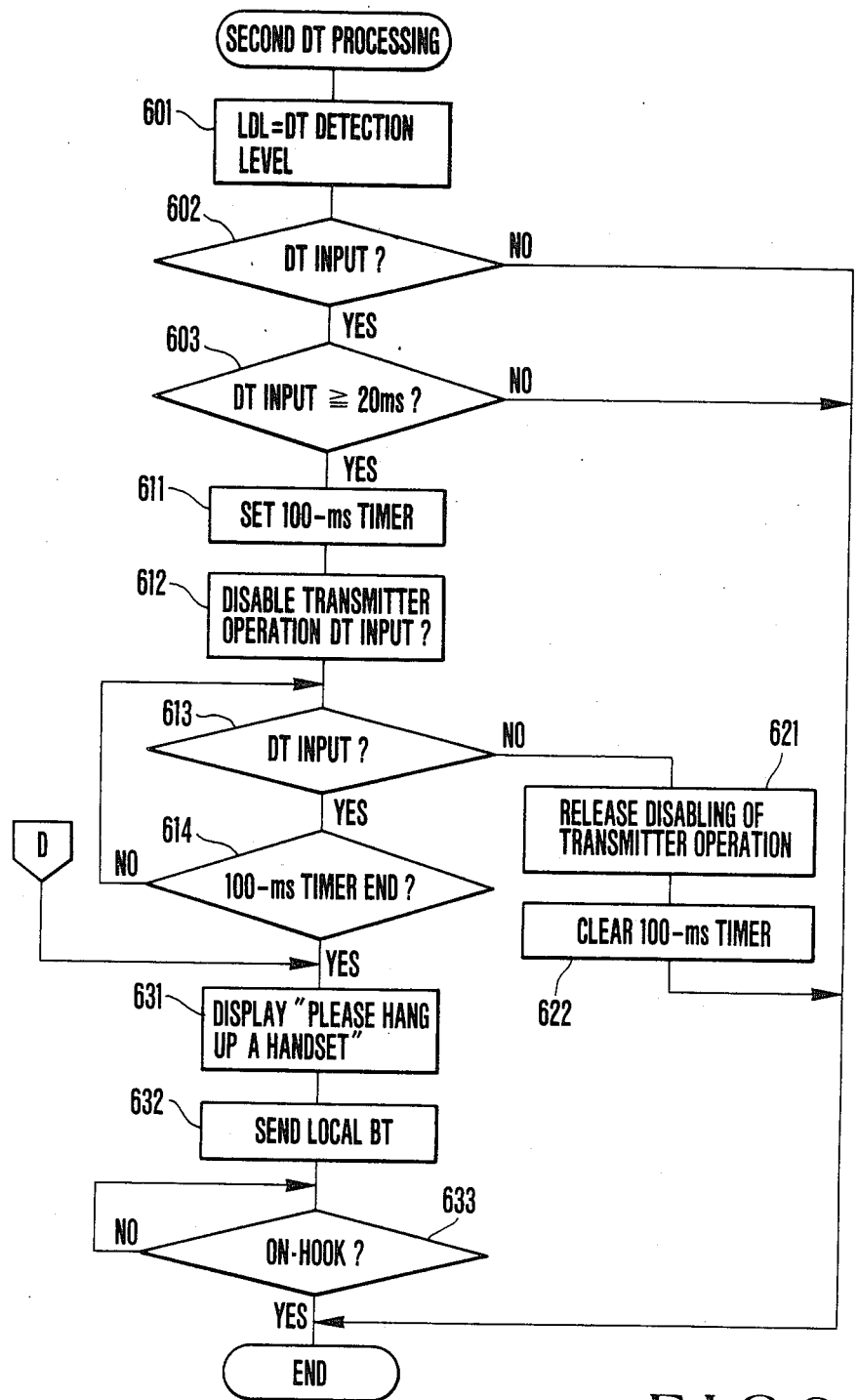
FIG. 8 is a flow chart for explaining secondary dial tone processing.

FIG. 8 is a flow chart for explaining a subroutine of "second DT processing" in step 523. In some of foreign countries, the DT is sent again as the second DT by an on-hook operation of a called party. In this case, dialing can be performed using a portable MF signal dial transmitter without repeating on-hook and off-hook operations. Therefore, the above processing is performed to prevent this.

That is, on the basis of Table 2, "LDL=DT detection level" is set in step 601 by sending the control signal CL, and frequencies of 350, 420, and 620 Hz are extracted by the detection output bits $D_{f1}$, $D_{f2}$, and $D_{f3}$. In accordance ith Y in "DT input?" in step 602, a time interval in which an exchange does not respond even if the MF dial signal is supplied thereto is determined in "DT input $\geq 20$ ms?" in step 603, and "set 100-ms (which is a time interval not adversely affecting communication) timer" is executed in step 611. Thereafter, "disable transmitter operation" is executed in step 612 by sending the mute signal MUT, an input signal from the transmitter T is interrupted to prevent erroneous detection, and then "DT input?" is determined in step 613 as in step 602. In accordance with Y in step 613, the flow in step 613 and subsequent steps is repeated while N in "100-ms timer end?" in step 611.

If N in step 613, "release disabling of transmitter operation" is executed in step 621 by stopping supply of the mute signal MUT, and "clear 100-ms timer" is executed in step 622 in correspondence to step 611.

If the DT is continuously detected for 100 ms even when the input signal from the transmitter T is interrupted and hence Y in step 614, the CPU sends display data to DP 12 to execute "display "please hang up a handset"" in step 631, and controls the BTG 14 to execute "send local BT" in step 632 with respect to the receiver R. Thereafter, in accordance with Y in "on-hook?" in step 633 caused by an output from the hook switch HS², the series of control is completed.

For this reason, the second DT sent in accordance with an on-hook operation of a called party is detected in accordance with duration of 20 ms or more, and the transmitter T is disabled for 100 ms to determine the second DT again. Therefore, illegal redialing is prevented, and the user is informed of impossibility of communication thereafter by supply of the local BT and display of DP 12.

Note that a disabling interval of the transmitter T is 100 ms and hence does not adversely affect communication if it is set.

Therefore, a signal tone is determined in correspondence to conditions by that setting of the LDL with respect to the FDT 8, detection of the respective natural frequency components in the respective signal tones on the basis of the LDL, and monitoring of duration of the respective frequency components. If it is determined that any of the respective frequency components is not any of the signal tones, this is determined to be a called party's voice, thereby reliably detecting a called party response. As a result, even if a signal representing a called party response is not sent, charging and enabling of communication can be correctly performed. If the second DT is sent by an on-hook operation of a called party after communication is started, the second DT is reliably detected, and a communication impossibility information state is set with respect to the user, thereby preventing illegal dialing.

Note that "INT processing" in step 151 of FIG. 4 in not directly related to detection of the second DT, and a detailed description thereof will be omitted. However, since the frequency component of 1,800 Hz is always included in the INT as a continuous tone of 200 ms to 400 ms, detection may be performed in accordance with this condition, and control similar to the flow in step 631 and subsequent steps may be performed in accordance with the detection.

Note that the frequency whose component is detected may be determined in accordance with a transmission frequency band and the like of each signal tone and the telephone line, and each timer for monitoring duration may be set in accordance with an intermittent state of each signal tone and a determination time.

Arrangements shown in FIGS. 1 and 2 may be arbitrarily selected in accordance with a situation. In addition, in FIGS. 3 to 8, steps may be exchanged with each other, a step may be replaced with another similar step, or an unnecessary step may be omitted, in accordance with determination conditions. Thus, various modifications can be arbitrarily made.

As has been described above, according to the present invention, the natural frequency component in the DT is detected, and the natural frequency component is detected again by setting disabling state of the transmitter according to the above detection, thereby reliably detecting the second DT and performing control corresponding thereto. As a result, a significant effect can be obtained in various terminals such as a public telephone set (which performs charging by, e.g., a coin and a telephone card), a facsimile system, and the like.

What is claimed is:

1. A called party response detecting apparatus in a terminal connected to a telephone line to which a signal representing a called party response is not sent, comprising:
   a plurality of filter units, connected to input sides in common, for respectively detecting natural frequency components included in a plurality of signals sent from the telephone line;
   switching means, arranged at a common input side of said filter units, for switching input levels of said filter units in a plurality of steps;
   continuous signal detecting means for detecting that a logical sum output from said filter units has continued for a predetermined time;
   input level control means for controlling said switching means to set an input level in a lowest level while waiting for a signal, to reset the input level in a predetermined level different from the lowest level when an output is obtained from one of said filter units, and during this reset operation, to decrease the input level step by step until an output is obtained from said continuous signal detecting means; and
   discriminating means for discriminating, when said continuous signal detecting means continuously detects logical sum outputs from said filter units for the predetermined time, a plurality of signal tones from a called party response in accordance with a generation frequency pattern of the outputs from said filter units within the predetermined time.

2. An apparatus according to claim 1, wherein said continuous signal detecting means has sampling means for sampling outputs from said filter units.

3. An apparatus according to claim 1, wherein said determining means determines that the filter output is a voice output when the filter output is not any of the plurality of signal tones.

4. An apparatus according to claim 2, wherein said input level control means, said continuous signal detecting means, said discriminating means, and said sampling means are constituted by a microcomputer having a sleep mode.

5. An apparatus according to claim 1, wherein said discriminating means discriminates a called party response only when said discriminating means cannot discriminate any of a plurality of signal tones and the logical sum output from said filter means is further obtained for a predetermined time.

6. An apparatus according to claim 1, further comprising:
   a processing means including a busy tone processing unit, a ring back tone processing unit, and an intercept processing unit, each unit being driven in accordance with discrimination results of said discriminating means; and
   a voice processing means.

7. An apparatus according to claim 6, wherein each of said units of said processing means comprises:
   means for checking a continuous arrival time of signals and means for checking a continuous time of outputs from a specific one of said filter units in accordance with the logical sum output from said filter units; and
   means for activating the individual processing means if a check result is acceptable.

8. An apparatus according to claim 7, further comprising means for activating said voice processing means if the check result is not acceptable.

9. An apparatus according to claim 7, further comprising means for activating another signal tone processing means if the check result is not acceptable.

10. An apparatus according to claim 7, further comprising means for initializing all said means if the check result is not acceptable.

11. An apparatus according to claim 6, wherein said voice processing means checks a continuous arrival time of signals in accordance with the logical sum output from said filter means and activates a predetermined one of said signal processing means in accordance with a check result.

12. An apparatus according to claim 2, wherein said discriminating means has a plurality of counters for counting outputs from said sampling means in units of outputs from said filter units and performs discrimination in accordance withcounter outputs.

13. An intermittent signal tone detecting apparatus in a terminal, connected to a telephone line to which a signal representing a called party response is not sent, for detecting an intermittent signal tone of a predetermined cycle including a ring back tone sent from the telephone line, and for controlling charging and communication in accordance with detection, comprising:
   detecting means for detecting a natural frequency component of the intermittent signal tone;
   memory means for storing an interruption time and duration of a detection output at least twice; and
   comparing means for comparing the current interruption time and duration respectively with the preceding ones;
   wherein the intermittent signal tone is detected in accordance with a substantial coincidence in comparison results.

14. A charging control apparatus using ring back tone detection in a charging terminal, connected to a telephone line to which a signal representing a called party response is not sent, for independently detecting natural frequency components included in various signal tones sent from the telephone line, for monitoring durations of the respective detection outputs, for determining a signal tone corresponding to a predetermined continuous time of a specific frequency component, and for determining a called party's voice when any of the frequency components cannot be determined to be any of the various signal tones, thereby detecting a called party response in accordance with determination, comprising:
   memory means for storing detection of a ring back tone when the ring back tone is determined;
   enabling means for enabling communication in accordance with determination of the voice; and
   timer means starting when the voice is detected;
   wherein charging is performed in accordance with storage of ring back tone detection when an on-hook operation is performed during the operation of said timer means.

15. A second dial tone detecting apparatus in a terminal connected to a telephone line to which a second dial tone is sent in accordance with an on-hook operation of a called party after communication is started, comprising:

detecting means for detecting a natural frequency component of the dial tone;

disabling means for disabling a transmitter when a detection output is obtained and detecting the natural frequency component again during a disabling state of the transmitter; and means for detecting the second dial signal tone when the detection output is obtained again.

16. A called party response detecting apparatus of a public telephone set connected to a telephone line to which a signal representing a called party response is not sent, comprising:

a plurality of filter units, connected to input sides in common, for respectively detecting natural frequency components included in a plurality of signals sent from the telephone line;

switching means, arranged at a common input side of said filter units, for switching input levels of said filter units in a plurality of steps;

continuous signal detecting means for detecting that a logical sum output from said filter units has continued for a predetermined time;

input level control means for controlling said switching means to set an input level in a lowest level while waiting for a signal, to reset the input level in a predetermined level different from the lowest level when an output is obtained from one of said filter units, and during this reset operation, to decrease the input level step by step until an output is obtained from said continuous signal detecting means;

discriminating means for discriminating, when said continuous signal detecting means continuously detects logical sum outputs from said filter units for the predetermined time, a plurality of signal tones from a called party response in accordance with a generation frequency pattern of the outputs from said filter units within the predetermined time; and charging means driven when said discriminating means determines a called party response.

17. An apparatus according to claim 16, further comprising a power source circuit charged by a local loop.

18. An apparatus according to claim 1, wherein each of said filter units is a band-pass filter, a center frequency and Q of which are selected in accordance with each frequency component to be extracted.

19. An apparatus according to claim 6, wherein said voice processing means includes timer means for measuring a predetermined time to determine a called party response again, and during this timer operation, said switching means, said continuous signal detecting means, said input level control means, and said timer means are repeatedly driven.

* * * * *